United States Patent [19]

Mafoti

[11] Patent Number: 5,001,166

[45] Date of Patent: Mar. 19, 1991

[54] NOVEL POLYETHERESTER BASED PREPOLYMERS AND ELASTOMERS MADE THEREFROM

[76] Inventor: Robson Mafoti, Mobay Corp., Mobay Rd., Pittsburgh, Pa. 15205

[21] Appl. No.: 301,692

[22] Filed: Jan. 25, 1989

[51] Int. Cl.[5] .................... C08G 18/10; C08G 18/42
[52] U.S. Cl. ........................... 521/159; 528/61; 528/64; 528/65; 528/76
[58] Field of Search ............ 528/61, 64, 65, 76; 521/159

[56] References Cited

U.S. PATENT DOCUMENTS

| | | | |
|---|---|---|---|
| 3,079,350 | 2/1963 | Berustein | 260/2.5 |
| 3,428,610 | 2/1969 | Kiebert | 260/75 |
| 3,483,169 | 12/1969 | Case et al. | 528/76 |
| 3,664,979 | 5/1972 | Tanomura et al. | 528/65 |
| 3,684,770 | 8/1972 | Maisert et al. | 528/65 |
| 3,746,665 | 7/1973 | Koleske et al. | 528/76 |
| 3,804,810 | 4/1974 | Fryd | 528/76 |
| 3,899,623 | 8/1975 | Okazaki et al. | 528/65 |
| 3,931,115 | 1/1976 | Strassel | 528/64 |
| 4,182,898 | 1/1980 | Fujiwara et al. | 528/64 |
| 4,218,543 | 8/1980 | Weber et al. | 521/51 |
| 4,296,212 | 10/1981 | Ewen et al. | 521/163 |
| 4,297,444 | 10/1981 | Gilbert et al. | 521/160 |
| 4,321,333 | 3/1982 | Alberino et al. | 521/159 |
| 4,341,875 | 7/1982 | Visger et al. | 521/164 |
| 4,374,210 | 2/1983 | Ewen et al. | 521/159 |
| 4,481,309 | 11/1984 | Straehle et al. | 528/76 |
| 4,590,219 | 5/1986 | Nissen et al. | 521/51 |
| 4,647,596 | 3/1987 | Ishii et al. | 521/159 |
| 4,798,851 | 1/1989 | Werner et al. | 528/64 |

*Primary Examiner*—Maurice J. Welsh
*Assistant Examiner*—Rabon Sergent

[57] ABSTRACT

The present invention is directed to isocyanate terminated prepolymers prepared from polyetheresters and isocyanates, and to the process of making elastomers and elastomers so produced.

8 Claims, No Drawings

NOVEL POLYETHERESTER BASED PREPOLYMERS AND ELASTOMERS MADE THEREFROM

BACKGROUND OF THE INVENTION

U.S. Pat. No. 3,428,610 describes the preparation of elastomers from isocyanate-terminated prepolymers and aromatic amines using a casting technique. U.S. Pat. No. 4,218,543 describes the production of elastomeric products using the RIM process from a reaction mixture of an isocyanate, a polyhydroxyl compound, and an aromatic amine.

The use of isocyanate-terminated prepolymers in combination with the same types of amines as described in the two patents noted above in a RIM process is also broadly described in the patent literature (see, e.g., U.S. Pat. Nos. 4,296,212, 4,297,444, 4,321,333, and 4,374,210). The use of polyester-based prepolymers in a RIM process is broadly described in U.S. Pat. Nos. 4,296,212, 4,297,444, and 4,374,210, while the use of polyesters in a RIM process is broadly described in U.S. Pat. Nos. 4,590,219 and 4,341,875. U.S. application Ser. No. 238,436, filed on Aug. 30, 1988, describes the use of a neopentyladipate based prepolymer in a RIM process.

Finally, prepolymers prepared from isocyanates and polyetheresters derived from polyethylene glycols and dicarboxylic acids are also known (see U.S. Pat. No. 3,079,350).

DESCRIPTION OF THE INVENTION

The present invention is directed to novel polyetherester based prepolymers and to the elastomeric products made therefrom. The elastomers produced from the prepolymers of the present invention have excellent physical properties over a wide temperature range. The elastomeric products herein can be used at relatively high temperatures without showing any soft segment crystallization at relatively low temperatures as evidenced by dynamic mechanical spectroscopy. Dynamic mechanical spectroscopy involves the determination of the dynamic mechanical properties of polymers. As a result of the analysis, the relationships among the dynamic properties, the structural parameters (e.g., crystallinity, molecular orientation, molecular weight, copolymerization, crosslinking and plasticization), and external variables (e.g., temperature, pressure, type of deformation, atmosphere and humidity) can be explained. Polymeric properties are temperature dependent. Plastics are hard and rigid at room temperature (22° C.) but become softer at high temperatures (e.g. 150° C.). Similarly, rubbers are elastic and soft at room temperature, but become harder at low temperatures (e.g. −30° C.). This hardness or stiffness is measured as a ratio of stress to strain at a certain stage of deformation. Further details relative to dynamic mechanical spectroscopy can be found in "Dynamic Mechanical Analysis of Polymeric Material", T. Murayama, Elsevier Scientific Publishing Co., New York, 1978.

More particularly, the present invention is directed to an isocyanate terminated prepolymer having an isocyanate group content of from about 4.5 to about 10.5% by weight and being prepared by reacting:

(a) an isocyanate selected from the group consisting of methylenebis(phenylisocyanate), polymethylene poly(phenylisocyanates), and mixtures thereof, and (b) a polyetherester having an OH number of from about 28 to about 75 and being prepared by reacting a polytetramethylene glycol having a molecular weight of from about 250 to about 1000 with a $C_2$ to $C_{10}$ aliphatic dicarboxylic acid.

The elastomers of the present invention are prepared by reacting the above-identified prepolymer with a chain extender or with a mixture of chain extender and amine terminated polyether. The elastomer may be prepared using a casting technique and is preferably prepared using the RIM process.

The prepolymer of the present invention requires an isocyanate selected from the group consisting of methylene-bis(phenylisocyanate), polymethylenepoly(phenylisocyanate) and mixtures thereof. By methylene bis(phenylisocyanate) is meant the 2,2'-isomer, the 2,4'-isomer, the 4,4'-isomer, and mixtures thereof. The 4,4'-isomer is presently preferred. The polymethylenepoly(phenylisocyanates) useful in the present invention are generally known and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979.

The polyetherester used to make the prepolymers of the present invention has an OH number of from about 28 to about 75 and preferably from about 28 to about 45. The polyetherester is prepared by reacting a $C_2$ to $C_{10}$ aliphatic dicarboxylic acid (or the anhydride thereof) with a polytetramethylene glycol having a molecular weight of from about 250 to about 1000, and preferably from about 400 to about 750. The polyetherester is prepared using conventional polyester preparation techniques, although it has been found that no esterification catalyst is required. Useful dicarboxylic acids include adipic, azelaic, sebacic, dodecanoic, succinic, glutaric and the like. Adipic acid is the presently preferred acid. Other diols and even triols can be used provided they are used in amounts of less than 20% by weight based on the combined weight of the hydroxy materials used to make the polyetheresters. In addition, other acids could also be used provided that they are used in amounts of less than 14% by weight based on the combined weight of the acid component.

The prepolymers are prepared by reacting the isocyanate with the polyetherester at temperatures of from 25° C. to 125° C. The resultant prepolymer has an isocyanate group content of from about 4.5 to about 10.5% by weight and preferably from about 5 to about 9% by weight.

The prepolymers of the present invention can be reacted in a mold via the casting process or preferably via the RIM process with a chain extender or with a mixture of a chain extender and an amine terminated polyether. Although hydroxyl group containing chain extenders (such as ethylene glycol, butane diol and the like) can be used, it is preferred to utilize amine terminated chain extenders. The preferred amine terminated chain extenders useful herein generally have molecular weights of from 108 to 400 and preferably contains exclusively aromatically bound primary or secondary (preferably primary) amino groups. Examples of such diamines are: 1,4-diaminobenzene, 2,4-diaminotoluene, 2,4'- and/or 4,4'-diaminodiphenyl methane, 3,3'-dimethyl-4,4'-diaminodiphenyl methane, 4,4'-diaminodiphenyl propane-(2,2) t-butyl toluene diamine, 1-methyl-3,5-bis(- methylthio)-2,4- and/or 2,6-diaminobenzene, and mixtures of such diamines.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 3 carbon atoms. It is particularly preferred to use such compounds in which an ethyl, n-propyl and/or isopropyl substituent is present in at least one position ortho to the amino groups and methyl substituents are present in the other positions ortho to the amino groups.

Specific examples of preferred amines are: 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4-diaminodiphenyl methane, 3,5,3',5'-tetraisopropyl-4,4'-diaminodiphenyl methane and 3,5-diethyl-3',5'-diisopropyl-4,4-diaminodiphenyl methane.

The above-mentioned aromatic diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene.

While it is preferred to use amine chain extenders alone it is also possible to use mixtures of such chain extenders with so-called amine terminated polyethers. Such polyethers generally contain at least two isocyanate reactive groups in end positions and have an average molecular weight (calculated from the functionality and the isocyanate reactive group content) of from 1800 to 12,000, preferably from 2000 to 8000. At least 50 equivalent percent (and preferably from 80–100 equivalent percent) of the isocyanate reactive end groups are primary and/or secondary (preferably primary) aromatically or aliphatically bound amino groups with the remainder being primary and/or secondary aliphatically bound hydroxyl group. When polyether mixtures are used, individual components of the mixture may have a molecular weight below 1800 (for example between 500 and 1800), provided that the average molecular weight of the mixture is within the range of 1800 to 12,000, The use of such mixtures in which individual components have a molecular weight below 1800 is, however, not preferred.

Compounds containing amino end groups may also be attached to the polyether chain by urethane or ester groups. These "amino polyethers" may be prepared by polyhydroxyl polyethers (e.g., polypropylene glycol ethers) by a reaction with ammonia in the presence of Raney nickel and hydrogen (Belgian Patent No. 634,741). U.S. Pat. No. 3,654,370 discloses the preparation of polyoxyalkylene polyamines by reaction of the corresponding polyol with ammonia and hydrogen in the presence of a nickel, copper, chromium catalyst. The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and French Patent No. 1,551,605. French Patent No. 1,466,708, discloses the preparation of polyethers containing secondary amino end groups. Also useful are the polyether polyamines described in U.S. Pat. Nos. 4,396,729, 4,433,067, 4,444,910 and 4,530,941, the disclosures of which are herein incorporated by reference.

Relatively high molecular weight polyhydroxypolyethers suitable for the process of the present invention may be converted into the corresponding anthranilic acid esters by reaction with isatoic acid anhydride. German Offenlegungs-schriften 2,019,432 and 2,619,840 and U.S. Pat. Nos. 3,808,250, 3,975,428 and 4,016,143 disclose methods for making polyethers containing aromatic amino end groups.

Relatively high molecular weight compounds containing amino end groups may be obtained according to German Offenlegungsschrift 2,546,536 or U.S. Pat. No. 3,865,791 by reacting isocyanate prepolymers based on polyhydroxyl polyethers with hydroxyl-containing enamines, aldimines or ketimines and hydrolyzing the reaction product.

The aminopolyethers which have been obtained by the hydrolysis of compounds containing isocyanate end groups are preferred starting materials (German Offenlegungsschrift 2,948,419). Polyethers preferably containing two or three hydroxyl groups are reacted (in the process disclosed in German Offenlegungsschrift 2,948,419) with polyisocyanates to form isocyanate prepolymers and the isocyanate group is then converted in a second step into an amino group by hydrolysis. Most preferred are polyamines prepared by hydrolyzing an isocyanate compound having an isocyanate group content of from 0.5 to 40% by weight. The most preferred polyamines are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful polyamines via isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645, European Patent 0,097,299 and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos.: 437,641, filed Oct. 19, 1982; 778,656 filed Sept. 23, 1985; 895,629, filed Aug. 11, 1986; 908,535, filed Sept. 16, 1986, and 916,923, filed Oct. 9, 1986. The most preferred polyamines contain from 2 to 4 amino groups and have molecular weights of from 350 to 6000.

The "amino polyethers" useful in the present invention are in many cases mixtures of the compounds described above. These mixtures generally should contain (on a statistical average.1 two to three isocyanate reactive end groups.

In the RIM process of the present invention, the "amino polyethers" may also be used as mixtures with polyhydroxyl polyethers which are free from amino groups (such as those exemplified in U.S. Pat. No. 4,218,543) or even highly branched polyether polyols having an average hydroxyl-functionality of about 3 to 6 and molecular weights of about 500 to 1000, although such mixtures are not preferred. If such mixtures are used, however, it is necessary to ensure that at least 50 equivalent percent of the isocyanate reactive groups present in the mixture are primary and/or secondary amino groups.

In addition to the components noted above, other materials may be added. Thus, known internal mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 3,365,215), German Offenlegungsschrift 2,431,968 (U.S. Pat. No. 4,098,731) or in German Offenlegungsschrift 2,404,310 (U.S. Pat. No. 4,058,492) are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino groups; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes.

The oleic acid or tall oil fatty acid salts of the amine containing amide groups which has been obtained by the reaction of N-dimethylaminopropylamine with oleic acid or tall oil fatty acid is particularly preferred.

Apart from the above-described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono- and/or polyisocyanates (according to German Offenlegungsschrift 2,356,692 (U.S. Pat. No. 4,033,912); esters of mono- and/or polycarboxylic acids and polysiloxanes containing hydroxy methyl groups (according to German Offenlegungsschrift 2,363,452 (U.S. Pat. No. 4,024,090)); and salts of polysiloxanes containing amino groups and fatty acids (according to German Offenlegungsschrift 2,417,272 or German Offenlegungsschrift 2,431,968 (U.S. Pat. No. 4,098,731)).

Also preferred are the zinc salts, e.g., zinc stearate, described in U.S. Pat. Nos. 4,581,386 and 4,519,965.

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the reactants. However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methyl-morpholine, N-ethyl-morpholine, N-cocomorpholine, N,N,N',N'-tetramethylene diamine, 1,4-diazabicyclo-(2,2,2)-octane, N-methyl-N'-dimethylaminoethyl piperazine, N,N'-dimethylbenzylamine, bis-(N,N-diethylaminoethyl)-adipate, N,N,-diethyl benzylamine, pentamethyl diethylene triamine, N,N-dimethyl-cyclohexylamine, N,N,N',N'-tetramethyl-1,3-butanediamine, N,N-dimethylimidazolephenyl-ethylamine, 1,2-dimethylimidazole and 2-methylimidazole.

Organometallic catalysts may also be used in the practice of the present invention. Particularly useful organometallic catalysts include organic tin catalysts such as tin-(II) salts of carboxylic acids (e.g., tin-(II)-acetate, tin-(II)-octoate, tin-(II)-ethyl hexoate and tin-(II)-laurate) and the dialkyl tin salts of carboxylic acids, (e.g., dibutyltin-diacetate, dibutyl-tin-dilaurate, dibutyl-tin-maleate or dioctyl-tindiacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.05 to 1 wt. % (based on component (i)) are appropriate.

The products of the process of the present invention are preferably compact molded articles. However, blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodifluoromethane and dichlorodifluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example, nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g. on pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g., of dodecyl benzene sulfonic acid or of dinaphthyl methane disulfonic acid) or of fatty acids such as ricinoleic acid or of polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g., tris-chloroethyl phosphate or ammonium phosphate and polyphosphate), stabilizers against ageing and weathering, plasticizers, fungistatic and bacteriostatic substances, and fillers (such as barium sulfate, glass fibers, kieselguhr or whiting).

Other examples of suitable surface active additives and foam stabilizers, flame retardants, plasticizers, dyes, fillers and fungistatic and bacteriostatic substances and details concerning the use and mode of action of these additives may be found in Kunststoff Handbuch, Volume VII, published by Vieweg and Hochtlen, Carl Hanser Verlag, Munich 1966, e.g., on pages 103 to 113.

Examples of other auxiliary agents and additives which may be used include low molecular weight polyhydric alcohols having a molecular weight of from 62 to 500, preferably from 62 to 400 (in quantities of up to 50 equivalent percent, based on the isocyanate reactive groups of the diamine used as component (ii)) in addition to the chain lengthening agent (component (ii)) to modify the properties of the molded articles. Ethylene glycol, butane-1,4-diol, hexamethylene glycol, trimethylolpropane, diethylene glycol, triethylene glycol, dipropylene glycol, tripropylene glycol, the propoxylation products of trimethylol propane having molecular weights of up to 500 preferably of up to 400 or the propoxylation products of ethylene diamine having molecular weights of up to 500 preferably of up to 400 are examples of such alcohols. The addition of such low molecular weight polyhydroxyl compounds is, however, less preferred.

When carrying out the process of the present invention, the quantity of prepolymer should preferably be such that the isocyanate index is from 70 to 130, most preferably 90 to 110 in the reaction mixture. By "isocyanate index" is meant the quotient of the number of isocyanate groups divided by the number of isocyanate reactive groups, multiplied by 100. When calculating the isocyanate index, any isocyanate reactive groups possibly present in the mold release agents (carboxyl groups) are not taken into account.

The process of the present invention can be carried out by a casting technique or by the known reaction injection molding technique (RIM process). Two streams are generally employed in this molding technique. In the present invention, the prepolymer is the first stream and components (i) and (ii) make up the second stream. If any auxiliary agents or additives are used, they are generally mixed with components (i) and (ii). However, it may be advantageous, for example when using a mold release agent containing isocyanate groups, to incorporate the release agent with the prepolymer before the RIM process is carried out. It is possible in principle to use mixing heads in which three or four separate components may be simultaneously introduced so that no preliminary mixing of the individual components is required. The quantity of reaction mixture introduced into the mold is generally calculated to produce molded articles having a density of from 0.8 to 1.4 g/cm$^3$, preferably from 0.9 to 1.2 g/cm$^3$. When mineral fillers are used, however, the molded articles may have a density above 1.2 g/cm$^3$. The articles may be removed from the mold after they have been left in there from 5 to 90 seconds, preferably from 20 to 60 seconds.

The reactant mixture is generally introduced into the mold at a starting temperature of from 10° to 60° C., preferably from 20° to 50° C. The temperature of the mold itself is generally from 40° to 100° C., preferably from 50° to 70° C.

The invention is further illustrated but is not intended to be limited by the following examples in which all parts and percentages are by weight unless otherwise specified.

EXAMPLES

The apparatus used to produce the polyetheresters of Examples 1 and 2 consisted of a vacuum jacketed distilling column with metal packing, a variable reflux ratio distilling head with a round bottom flask attached to it to receive the water and excess glycols, a five liter three neck flask, a thermoregulator, and a heating mantle.

EXAMPLE 1

A five liter flask was charged with 3239 parts (4.7 moles) of a 690 molecular weight polytetramethylene glycol. The flask was then connected to the polyester preparation apparatus and the temperature of the flask was raised to 160° C. Nitrogen was bubbled through the flask and 480 parts (3.3 moles) of adipic acid were slowly added with stirring. The temperature was raised to 220° C. at the completion of the addition. Water was collected in the receiving flask. After the atmospheric cycle, vacuum was slowly applied to the system and more water was distilled over (115 parts total water was collected). The polyetherester had an acid number of less than 1 and an OH number of about 40. The viscosity of the polyetherester at 25° C. was about 4200 mPa.s.

EXAMPLE 2 (Comparative)

The material used for this preparation consisted of 3162 parts (5.3 moles) of a 600 molecular weight polyethylene glycol and 582 parts (4 moles) of adipic acid. The procedure was exactly the same as was used in Example 1. About 145 parts of water were collected. The resultant polyetherester had an acid number of less than 1, an OH number of about 37 and a viscosity at 25° C. of 3600 mPa.s.

EXAMPLE 3

3392 parts of the polyetherester of Example 1 were slowly added to a rapidly stirred solution of 1108 parts of 4,4'-methylenebis(phenylisocyanate) at 60° C. After completion of the addition, the mixture was held at 60° C. for about one hour. The resultant prepolymer had an isocyanate group content of 5.9% by weight and was a liquid at room temperature.

EXAMPLE 4 (Comparative)

4248 parts of the polyetherester of Example 2 were reacted with 1352 parts of 4,4'-methylenebis(phenylisocyanate) using the same procedure as was used in Example 3. The resultant prepolymer had an isocyanate group content of 6% by weight.

EXAMPLES 5 AND 6

RIM plaques were prepared using a laboratory piston metering unit and clamping unit. The metering unit was a two component instrument having a maximum metering capacity of 0.6 liters. A rectangular mold, 300 mm × 200 mm × 3 mm was used to mold the samples under the following conditions:

| | |
|---|---|
| Prepolymer Temp. | 90° C. |
| Component B Temp. | 50° C. |
| Isocyanate Index | 105 |
| Mold Temp. | 65° C. |

| | |
|---|---|
| Demold Time | 45 seconds |

In the case of Example 5, 838.4 parts of the prepolymer of Example 3 were reacted with the B-side, which consisted only of 100 parts of an 80:20 mixture of 1-methyl-3,5-diethyl-2,4- and 2,6-phenylene diamine. In the case of Example 6, 828 parts of the prepolymer of Example 4 were reacted with the B-side, which consisted only of 100 parts of the same amine mixture. The molded parts were tested for tensile strength (ASTM D412), ultimate elongation (ASTM-D-638), compression set (ASTM D395), die C tear strength (ASTM D624) and split tear Federal Test Method 4221. The results were as indicated in the following table:

TABLE

| | Example 5 | Example 6 |
|---|---|---|
| Tensile Strength, psi | 7000 | 2750 |
| Ultimate Elongation (%) | 450 | 300 |
| Compression Set, % | 62 | 71 |
| Die C Tear, lbs/in | 445 | 340 |
| Split Tear, lbs/in | 210 | 133 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate terminated prepolymer having an isocyanate group content of from about 4.5 to about 10.5% by weight and being prepared by reacting:
    (a) an isocyanate selected from the group consisting of methylenebis(phenylisocyanate), polymethylenepoly(phenylisocyanates), and mixtures thereof, and
    (b) a polyetherester having an OH number of from about 28 to about 75 and being prepared by reacting a polytetramethylene glycol having a molecular weight of from about 250 to about 1000 and a $C_2$ to $C_{10}$ aliphatic dicarboxylic acid.

2. The prepolymer of claim 1, wherein said isocyanate a) is the 4,4'-isomer of methylenebis(phenylisocyanate).

3. The prepolymer of claim 1 wherein said polyetherester has an OH number of from about 28 to about 45.

4. The prepolymer of claim 1, wherein said glycol has a molecular weight of from about 400 to about 750.

5. The prepolymer of claim 1, wherein said acid is adipic acid.

6. The prepolymer of claim 1 having an isocyanate group content of from about 5 to about 9% by weight.

7. An elastomer prepared by reacting an isocyanate terminated prepolymer having an isocyanate group content of from about 4.5 to about 10.5% by weight and being prepared by reacting:
    (a) an isocyanate selected from the group consisting of methylenebis(phenylisocyanate), polymethylenepoly(phenylisocyanates), and mixtures thereof, and
    (b) a polyetherester having an OH number of from about 28 to about 75 and being prepared by reacting a polytetramethylene glycol having a molecular weight of from about 250 to about 1000 and a $C_2$ to $C_{10}$ aliphatic dicarboxylic acid, with a chain extender or with a mixture of a chain extender and an amine terminated polyether.

8. A process for preparing an elastomer comprising reacting an isocyanate terminated prepolymer having an isocyanate group content of from about 4.5 to about 10.5% by weight and being prepared by reacting:
    (a) an isocyanate selected from the group consisting of methylenebis(phenylisocyanate), polymethylenepoly(phenylisocyanates), and mixtures thereof, and
    (b) a polyetherester having an OH number of from about 28 to about 75 and being prepared by reacting a polytetramethylene glycol having a molecular weight of from about 250 to about 1000 and a $C_2$ to $C_{10}$ aliphatic dicarboxylic acid, with a chain extender or with a mixture of a chain extender and an amine terminated polyether, at an isocyanate index of from 70 to 130.

* * * * *

UNITED STATES PATENT AND TRADEMARK OFFICE
CERTIFICATE OF CORRECTION

PATENT NO. : 5,001,166
DATED : March 19, 1991
INVENTOR(S) : Robson Mafoti

It is certified that error appears in the above-identified patent and that said Letters Patent is hereby corrected as shown below:

On the title page: Item [73] insert

--Assignee: Mobay Corporation, Pittsburgh, Pa.--.

Signed and Sealed this

Sixteenth Day of November, 1993

Attest:

BRUCE LEHMAN

Attesting Officer

Commissioner of Patents and Trademarks